United States Patent
Vermillion et al.

(10) Patent No.: US 11,230,391 B2
(45) Date of Patent: Jan. 25, 2022

(54) SYSTEMS AND METHODS FOR ATTITUDE CONTROL OF TETHERED AEROSTATS

(71) Applicant: Altaeros Energies, Inc., Somerville, MA (US)

(72) Inventors: Christopher R. Vermillion, Boston, MA (US); Benjamin William Glass, Winchester, MA (US); Andrew D. Goessling, Boston, MA (US)

(73) Assignee: Altaeros Energies, Inc., Somerville, MA (US)

( * ) Notice: Subject to any disclaimer, the term of this patent is extended or adjusted under 35 U.S.C. 154(b) by 630 days.

(21) Appl. No.: 15/776,552

(22) PCT Filed: Nov. 16, 2016

(86) PCT No.: PCT/US2016/062266
§ 371 (c)(1),
(2) Date: May 16, 2018

(87) PCT Pub. No.: WO2017/087515
PCT Pub. Date: May 26, 2017

(65) Prior Publication Data
US 2020/0024000 A1  Jan. 23, 2020

Related U.S. Application Data (63) Continuation of application No. 14/943,008, filed on Nov. 16, 2015, now abandoned.

(51) Int. Cl.
*B64F 3/00* (2006.01)
*B64B 1/50* (2006.01)

(52) U.S. Cl.
CPC . *B64F 3/00* (2013.01); *B64B 1/50* (2013.01)

(58) Field of Classification Search
CPC ............... B64F 3/00; B64B 1/50; B64B 1/66
(Continued)

(56) References Cited

U.S. PATENT DOCUMENTS

| 653,221 A | 7/1900 | Deydier |
| 1,724,890 A | 8/1929 | Upson |

(Continued)

FOREIGN PATENT DOCUMENTS

| CA | 3009980 A1 * | 7/2017 | ........... B64C 39/024 |
| EP | 0 045 202 A1 | 2/1982 | |

(Continued)

OTHER PUBLICATIONS

International Search Report and Written Opinion dated Mar. 18, 2013 for corresponding International Application No. PCT/US2012/055898.

(Continued)

*Primary Examiner* — Christopher P Ellis
(74) *Attorney, Agent, or Firm* — Wolf, Greenfield & Sacks, P.C.

(57) ABSTRACT

A control system for a tethered aerostat is provided, where at least one rotational and at least one translational degree of freedom are controlled to setpoints through the variation of tether lengths by an actuator system. The term tether includes a single tether, a tether group or a sub section of tether controlled by an individual actuator. Accurate rotational and translational control is essential for the successful operation of an aerostat under several applications, including surveillance, weather monitoring, communications, and power generation. For a given use case, the controller can be constructed and arranged to manage the tradeoff between several key performance characteristics, such as transient performance, steady-state pointing accuracy, tether tension regulation, and power generation.

20 Claims, 4 Drawing Sheets

(58) Field of Classification Search
USPC .......................................................... 244/33
See application file for complete search history.

(56) References Cited

U.S. PATENT DOCUMENTS

| | | | |
|---|---|---|---|
| 1,812,237 A | 6/1931 | Ancira Garcia | |
| 1,823,466 A | 9/1931 | Powelson et al. | |
| 1,845,229 A | 2/1932 | Bradshaw | |
| 1,848,828 A | 3/1932 | Griffin | |
| 2,433,344 A * | 12/1947 | Crosby | B64B 1/40 343/706 |
| 2,704,193 A | 3/1955 | Alard | |
| 2,948,489 A * | 8/1960 | Miller, Jr. | B64C 39/022 244/17.17 |
| 3,149,803 A * | 9/1964 | Thracy | B64C 39/022 244/17.13 |
| 3,972,492 A | 8/1976 | Milne | |
| 3,972,493 A | 8/1976 | Milne | |
| 4,165,468 A | 8/1979 | Fry et al. | |
| 4,166,596 A | 9/1979 | Moulton, Jr. et al. | |
| 4,207,026 A | 6/1980 | Kushto | |
| 4,285,481 A | 8/1981 | Biscomb | |
| 4,309,006 A | 1/1982 | Biscomb | |
| 4,350,896 A | 9/1982 | Benoit | |
| 4,350,897 A | 9/1982 | Benoit | |
| 4,350,898 A | 9/1982 | Benoit | |
| 4,350,899 A | 9/1982 | Benoit | |
| 4,450,364 A | 5/1984 | Benoit | |
| 4,470,563 A * | 9/1984 | Engelsman | F03D 13/20 244/33 |
| 4,789,302 A | 12/1988 | Gruzling | |
| 4,832,571 A | 5/1989 | Carrol | |
| 5,080,302 A | 1/1992 | Hoke | |
| 5,431,359 A | 7/1995 | Belie | |
| 5,497,962 A * | 3/1996 | Wood | B64F 1/14 244/116 |
| 5,509,624 A | 4/1996 | Takahashi | |
| 5,836,738 A | 11/1998 | Finney | |
| 6,224,015 B1 * | 5/2001 | Reinhard | B61B 7/00 244/24 |
| 6,382,904 B1 | 5/2002 | Orlov et al. | |
| 6,523,781 B2 | 2/2003 | Ragner | |
| 7,188,808 B1 | 3/2007 | Olson | |
| 7,275,719 B2 | 10/2007 | Olson | |
| 7,335,000 B2 * | 2/2008 | Ferguson | F03D 3/002 417/7 |
| 7,582,981 B1 * | 9/2009 | Meller | F03D 1/025 290/44 |
| 7,775,483 B2 | 8/2010 | Olson | |
| 8,018,079 B2 | 9/2011 | Kelly | |
| 8,100,366 B2 | 1/2012 | Milanese et al. | |
| 8,240,598 B2 * | 8/2012 | Redford | B64B 1/30 244/33 |
| 8,253,265 B2 | 8/2012 | Glass | |
| 8,539,746 B2 | 9/2013 | Ippolito | |
| 8,544,788 B1 * | 10/2013 | Capper | B64B 1/28 244/33 |
| 8,602,349 B2 | 12/2013 | Petrov | |
| 8,624,421 B2 | 1/2014 | Ippolito | |
| 8,939,396 B2 * | 1/2015 | Geneste | B64D 39/00 244/31 |
| 9,187,165 B2 * | 11/2015 | Vermillion | B64B 1/00 |
| 9,789,947 B2 * | 10/2017 | Glass | B64B 1/52 |
| 9,952,022 B2 * | 4/2018 | Ueno | G05D 1/0094 |
| 10,364,026 B1 * | 7/2019 | Hanlon | B64F 3/02 |
| 10,703,474 B2 * | 7/2020 | Kapuria | B64C 39/022 |
| 2002/0040948 A1 | 4/2002 | Ragner | |
| 2007/0013196 A1 | 1/2007 | Chen | |
| 2007/0120004 A1 | 5/2007 | Olson | |
| 2007/0120005 A1 | 5/2007 | Olson | |
| 2007/0126241 A1 * | 6/2007 | Olson | F03D 5/06 290/55 |
| 2008/0048453 A1 | 2/2008 | Arnick | |
| 2009/0033098 A1 * | 2/2009 | Griffith | F03D 7/00 290/55 |
| 2009/0072092 A1 | 3/2009 | Griffith et al. | |
| 2009/0230236 A1 | 9/2009 | Tillotson | |
| 2009/0294584 A1 * | 12/2009 | Lovell | B63B 27/10 244/110 F |
| 2010/0019091 A1 * | 1/2010 | Milanese | B63H 9/069 244/155 A |
| 2010/0032947 A1 | 2/2010 | Bevirt | |
| 2010/0133385 A1 * | 6/2010 | Olson | G01W 1/08 244/155 A |
| 2010/0213718 A1 | 8/2010 | Kelly | |
| 2011/0035149 A1 | 2/2011 | McAndrew et al. | |
| 2011/0180667 A1 * | 7/2011 | O'Brien | B64C 39/024 244/135 R |
| 2011/0315810 A1 * | 12/2011 | Petrov | B64C 39/024 244/17.23 |
| 2012/0049533 A1 | 3/2012 | Kelly | |
| 2012/0181380 A1 * | 7/2012 | Van Staagen | B64B 1/50 244/33 |
| 2013/0075523 A1 | 3/2013 | Vermillion et al. | |
| 2014/0012433 A1 | 1/2014 | Vojtech et al. | |
| 2014/0263852 A1 * | 9/2014 | Walker | H02G 11/02 244/53 R |
| 2015/0053255 A1 | 2/2015 | Goldstein | |
| 2015/0083849 A1 | 3/2015 | Glass et al. | |
| 2015/0153741 A1 * | 6/2015 | North | G05D 1/0866 290/44 |
| 2015/0298806 A1 * | 10/2015 | Vander Lind | B64C 39/022 518/704 |
| 2015/0329204 A1 | 11/2015 | Nelson | |
| 2016/0122014 A1 | 5/2016 | Jang | |
| 2016/0139601 A1 | 5/2016 | Vermillion et al. | |
| 2016/0207625 A1 | 7/2016 | Judas et al. | |
| 2017/0043872 A1 * | 2/2017 | Whitaker | B64D 1/18 |
| 2017/0129600 A1 | 5/2017 | Rancourt et al. | |
| 2017/0158342 A1 | 6/2017 | Ishii et al. | |
| 2017/0259941 A1 * | 9/2017 | Briggs, IV | B64C 39/022 |
| 2018/0009549 A1 * | 1/2018 | Sullivan | B64F 1/22 |
| 2018/0251216 A1 * | 9/2018 | Whitaker | B64C 39/024 |
| 2018/0312276 A1 * | 11/2018 | Miller | B64C 39/022 |
| 2020/0057455 A1 | 2/2020 | Glass et al. | |

FOREIGN PATENT DOCUMENTS

| | | | |
|---|---|---|---|
| EP | 0 935 068 A2 | 8/1999 | |
| GB | 2 164 910 A | 4/1986 | |
| JP | 1986-085297 A2 | 4/1986 | |
| JP | 1988-227499 A2 | 9/1988 | |
| JP | 1988-235197 A | 9/1988 | |
| JP | 1988-235198 A | 9/1988 | |
| JP | 2009-511198 A | 11/1997 | |
| JP | 2003-137189 A2 | 5/2003 | |
| KR | 20100065856 A * | 6/2010 | B64B 1/50 |
| KR | 10-2010-0065856 A | 4/2012 | |
| WO | WO 00/63074 A1 | 10/2000 | |
| WO | WO 2010/006433 A1 | 1/2010 | |
| WO | WO 2011/012996 A2 | 2/2011 | |
| WO | WO 2013/043586 A2 | 3/2013 | |
| WO | WO 2013/109689 A1 | 7/2013 | |
| WO | WO 2015/038697 A2 | 3/2015 | |

OTHER PUBLICATIONS

International Preliminary Report on Patentability dated Apr. 3, 2014 for corresponding International Application No. PCT/US2012/055898.

International Search Report and Written Opinion dated Feb. 28, 2017 for corresponding International Application No. PCT/US2016/062266.

International Preliminary Report on Patentability dated May 31, 2018 for corresponding International Application No. PCT/US2016/062266.

International Search Report and Written Opinion dated May 13, 2013 for correspondng International Application No. PCT/US2013/021837.

International Preliminary Report on Patentability dated Jul. 31, 2014 for corresponding International Application No. PCT/US2013/021837.

(56) References Cited

OTHER PUBLICATIONS

Extended European Search Report dated Sep. 28, 2015 for corresponding European Application No. 13738570.4.
Invitation to Pay Additional Fees dated Dec. 26, 2017 in connection with International Application No. PCT/2017/057177.
International Search report and Written Opinion dated Feb. 22, 2018 in connection with International Application No. PCT/US2017/057177.
International Preliminary Report on Patentability dated May 2, 2019 in connection with International Application No. PCT/US2017/057177.
Extended European Search Report dated May 7, 2020 in connection with European Application No. 17862190.0.

\* cited by examiner

SYSTEMS AND METHODS FOR ATTITUDE CONTROL OF TETHERED AEROSTATS

RELATED APPLICATIONS

This application is a national stage filing under 35 U.S.C. § 371 of International Patent Application Serial No. PCT/US2016/062266, filed Nov. 16, 2016, entitled "SYSTEMS AND METHODS FOR ATTITUDE CONTROL OF TETHERED AEROSTATS," which claims priority to U.S. patent application Ser. No. 14/943,008, filed Nov. 16, 2015, entitled "SYSTEMS AND METHODS FOR ATTITUDE CONTROL OF TETHERED AEROSTATS," each of which is hereby incorporated herein by reference in its entirety.

FIELD OF THE INVENTION

The present invention relates to control systems and methods of tethered aerostats.

BACKGROUND OF THE INVENTION

Moored (tethered) aerostats have had widespread use in several applications, including surveillance, advertising, and weather monitoring, where the aerostat's stationary position and altitude control allows its objective to be carried out successfully. There has been an increased desire to substitute tethered aerostats or kite-based systems for traditional wind turbines in order to deliver significantly more wind energy than a traditional turbine at a fraction of the cost. In all of these applications, it is desirable that the altitude of the aerostat be controlled and that the aerostat remains steady during operation. For wind energy generation applications, aerostat-based systems offer an advantage over kite-based systems due to the fact that they are based on well-established core technology and include a "lighter-than-air" (often helium) lifting body that provides upward force even in the absence of wind. Still, because such aerostats are often affected by aerodynamic as well as buoyant forces, poor control over attitude can disadvantageously lead to loss of dynamic stability. Furthermore, in applications such as wind energy generation, the performance of the system is contingent not only on altitude control but also on the ability for the aerostat to point in a desirable direction, where the direction that the aerostat points is referred to as its "attitude".

Prior systems have concentrated on altitude control for tethered aerostats, providing a configuration for which the aerostat remains stationary but is not controlled to a particular attitude. Furthermore, several concepts, such as the method and apparatus described in U.S. Pat. No. 5,080,302, filed Sep. 5, 1990, entitled METHOD AND APPARATUS FOR AERIALLY TRANSPORTING LOADS, by Hoke, provide for this stability by leading the tethers to points on the ground that are widely separated. This type of design requires an elaborate ground station for control of the aerostat altitude and requires an additional pivot at altitude for the aerostat to passively orient itself into the wind, a requirement that is essential for energy generation. Accordingly, there is a need for a system that provides control for a system effectively and efficiently by lessening the need for external control devices and/or sophisticated calibration algorithms, to control attitude of a tethered aerostat.

SUMMARY OF THE INVENTION

To overcome the disadvantages of the prior art, in accordance with an illustrative embodiment this invention employs two or more actuators, originating from a single actuator platform on the ground, to control the aerostat altitude and at least one independent attitude variable. This lessens need for additional control in terms of camera adjustment for surveillance and reduces the need for sophisticated calibration algorithms on weather instrumentation that is mounted on the aerostat. Furthermore, for power generation applications, altitude control allows the aerostat to seek the optimal altitude for wind strength, without exceeding its rated capacity, and attitude control allows for further optimization of power generated, while also providing a mechanism for ensuring system stability when aerodynamic forces dominate buoyant forces.

A control system for a tethered aerostat includes an actuator system for accurate rotational and translational control of the aerostat. In an illustrative embodiment, a tethered aerostat is connected to an actuation platform via tethers. The actuation platform includes at least two independent actuators that control a control variable of the tethers attached to the actuators. By way of example, the control variable may be tether payout length, tether release speed, tether acceleration, tether slip threshold, tether tension, actuator platform angular orientation (heading), actuator platform angular speed, and actuator platform angular acceleration. Illustratively, the aerostat is connected to the actuator system via at least two tethers. The number of tethers is highly variable and typically includes at least two in an illustrative embodiment. According to the illustrative embodiment, each tether terminates at a single actuator on the actuation platform which has a control unit for providing input to the actuators in order to achieve the desired tether release rates, tether release acceleration, tether payout length, tether slip threshold, tether tension, actuator platform angular orientation (heading), actuator platform angular speed, and/or actuator platform angular acceleration, as well as maximum thresholds for variables, so that for example, tension above a certain threshold can result in additional tether being released so as to avoid excessive tension that would result in an increased risk of tether breakage. The control unit provides commands to the actuators in order to regulate at least two independent position and/or orientation (attitude) variables.

BRIEF DESCRIPTION OF THE DRAWINGS

The invention description below refers to the accompanying drawings, of which.

DETAILED DESCRIPTION

According to various illustrative embodiments, a control system for a moored (or tethered) aerostat varies the tether lengths through an actuator system. The term "tether" as used herein refers to a single tether, a group of tethers or a sub-section of tether controlled by an individual actuator or any other combination of tethers known to those ordinarily skilled in the art. The fabric and materials used for tethers is highly variable within ordinary skill. Accurate rotational and translational control of an aerostat is highly desirable for the successful operation of an aerostat. The location of an aerostat can be described in a Euclidean 3-dimensional space using three dimension coordinates. Translational control means controlling the location of the aerostat in at least one dimension. The rotational orientation of an aerostat can be described in a Euclidean 3-dimensional space using Euler angles. Rotational control means controlling the rotational orientation of the aerostat with regard to at least one axis. There are several applications for aerostats, including surveillance, weather monitoring, communications, and power generation, among others. The controller manages the tradeoff between several key performance characteristics, such as transient performance, steady-state pointing accuracy, tether tension regulation and power generation, as described in greater detail hereinbelow. Furthermore, in applications such as wind energy generation, the performance of the system is contingent not only on altitude control but also on the ability for the aerostat to point in a desirable direction, where the direction that the aerostat points is referred to as its "attitude". For useful background information relating to various embodiments of aerostats and energy-producing turbines, refer to commonly assigned U.S. application Ser. No. 12/579,839, filed Oct. 15, 2009, entitled POWER-AUGMENTING SHROUD FOR ENERGY-PRODUCING TURBINES, by Benjamin W. Glass, the entire disclosure of which is herein incorporated by reference.

In an illustrative embodiment, the system described herein uses extremum seeking control for determination of an altitude setpoint, in which the altitude of the system is periodically perturbed and power output is evaluated. In the embodiment, the altitude setpoint is adjusted in a direction in which power output is observed to be increasing.

In another illustrative embodiment, the system described herein is a model predictive control (MPC) system for determination of setpoints, in which a trajectory of setpoints is computed in order to deliver optimal performance over a receding horizon. For example, for a horizon length of N steps, which comprises seconds, NT where T is the controller time step (in seconds), the MPC system is set up to minimize a cost function:

$$l(x(k), r(k)) = u \sum_{i=k}^{k+N-1} g(x(i|k), r(j|k))$$

Subject to constraints:

$x(j|k) \in X, i=k \ldots k+N-1$ $r(j|k) \in R, i=k \ldots k+N-1$ where x represents the state of the system and r represents the manipulated variables (in this case, pitch, roll, and altitude setpoints) to the system. The stage cost, g, can consist of as many terms as desired to properly characterize the performance properties of the system that are to be traded off. Furthermore, as many constraints as appropriate can be incorporated to maintain the optimization problem as feasible. In an illustrative embodiment, the stage cost consists of a term for power usage, another term for transient performance, and a state constraint for tether tension.

In order to limit the amount of energy consumed by the actuator system, and ensure that the actuator system does not remain continuously active during the course of operation, the various illustrative embodiments are constructed and arranged such that the controller incorporates a deadband. In this deadband the control signal can be equal to approximately 0 whenever certain prescribed signals are sufficiently close to their desired values. Taking a control input, for example, tether release rate, at discrete time instant k as u(k) and a generic performance variable at time instant k as y(k), this deadband is implemented as an adjustment of the raw control input, $u^{raw}$ (before the deadband is applied) as follows:

$$u(k) = u^{raw}(k), |y| > y^{deadband}$$
$$0, \text{otherwise}$$

In general, there is no limit to the number of variables on which the deadband can apply.

According to an illustrative embodiment, a hysteresis loop is incorporated within the controller, such that the deadband entry criteria differs from the deadband exit criteria. The application of the deadband is modified as follows, taking u(k) as the control input, in accordance with the illustrative embodiment:

$$u(k) = u^{raw}(k), |y| > y^{deadband}$$
$$0, \text{otherwise} \quad \text{if } |u(k-1)| = 0$$
$$u(k) = u^{raw}(k), |y| > y^{deadband}$$
$$0, \text{otherwise} \quad \text{otherwise}$$

A power generation unit can be incorporated within or otherwise connected to the aerostat, which can consist primarily of at least one turbine and generator. The generation unit can also include additional signal conditioning equipment (such as step-up transformers, for example), to transform the generated electrical signal to a higher voltage signal for the purpose of transmission to a base station. A conductive element can be included in one of the tethers used for control, or an additional tether can be provided for transmission of power to the base station. The energy-generation embodiment is applicable to the various illustrative embodiments described hereinabove. In an embodiment, telecommunications or other communications equipment can be incorporated within or otherwise connected to the aerostat.

Figure 1:
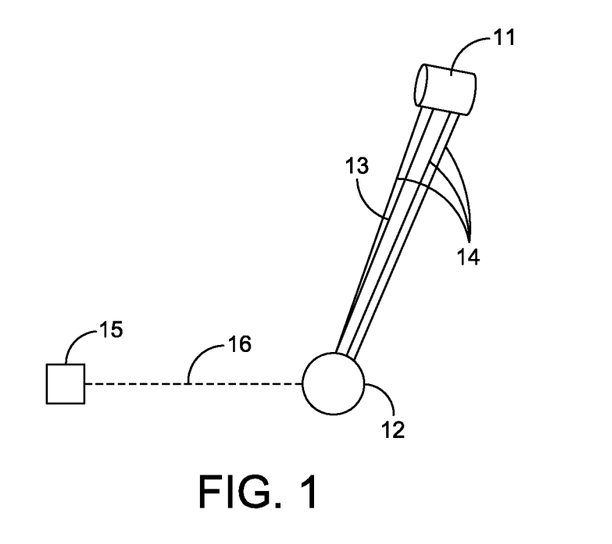
FIG. 1 is a schematic diagram of the overall system architecture for an aerostat as tethered to an actuation platform, according to an illustrative embodiment.
Figure 2:
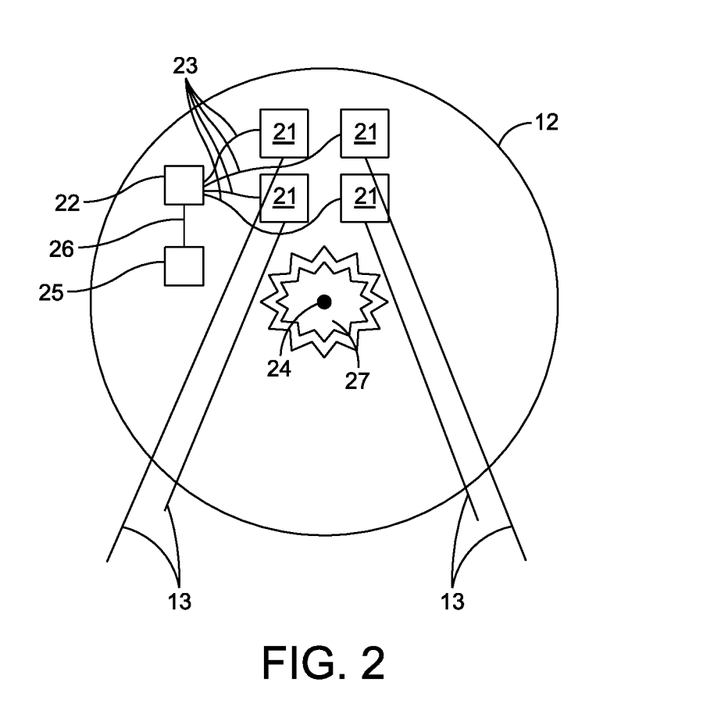
FIG. 2 is a schematic diagram of a top view of an actuator platform of the system, according to the illustrative embodiment.
Figure 3:
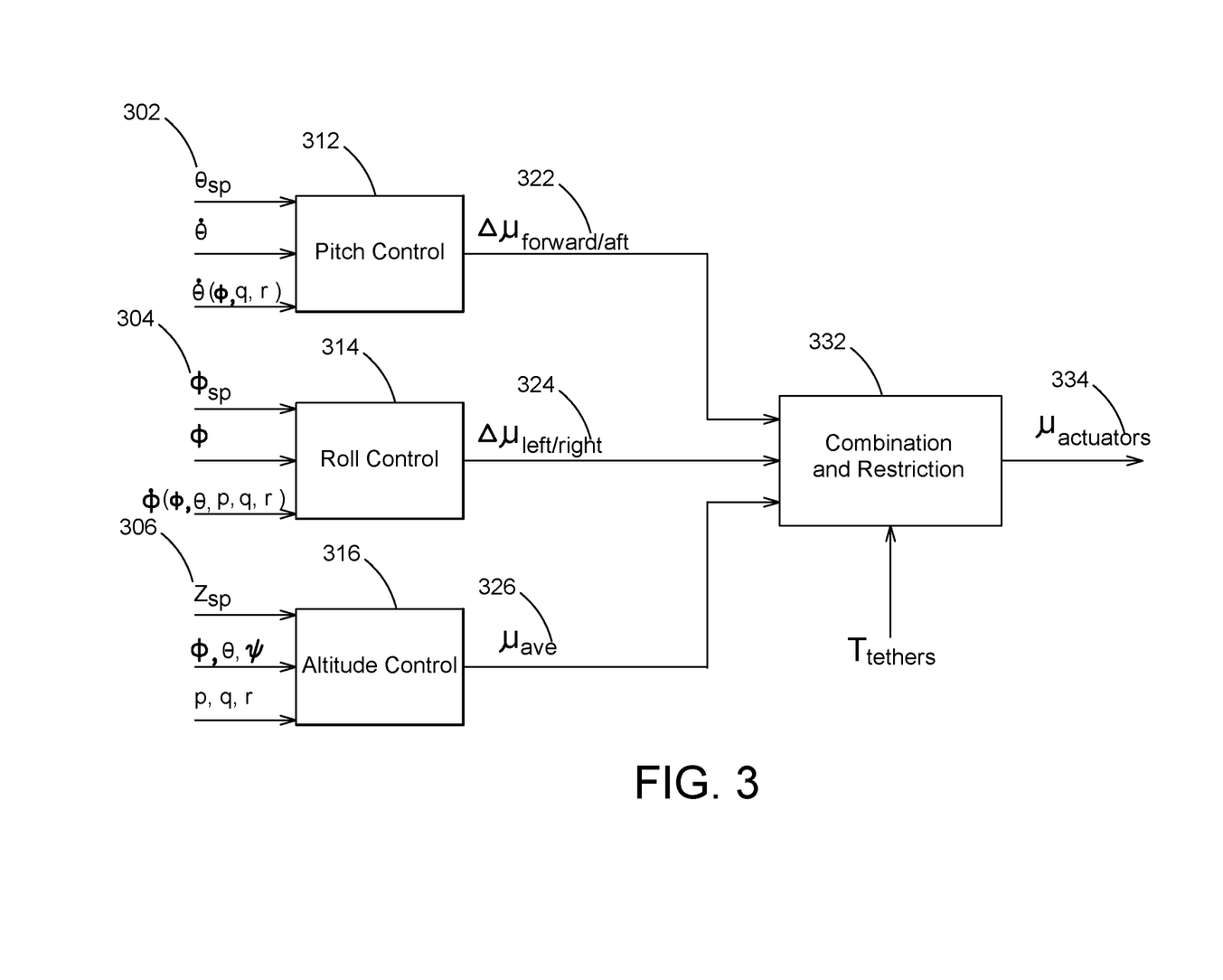
FIG. 3 is a block diagram of the various inputs and areas of control for the combination and restriction process, according to the illustrative embodiment.

In accordance with an illustrative embodiment, a tethered aerostat 11 shown in FIGS. 1 and 2 is secured to an actuation platform 12 having at least 2 independent actuators 21 that control at least one tether control variable, such as tether release speed, for the aerostat tethers that are attached to the actuators. Controlling the release speeds of the tethers thereby controls the tether length. The aerostat 11 is connected to the actuator system via tethers 13. As shown in FIG. 2, each tether can terminate at a single actuator. A control unit 22 provides inputs (voltages or other inputs known in the art) to the actuators 21 to achieve desired tether release rates at the actuators. The control unit 22 can provide commands via communication links 23 to the actuators 21 to regulate at least two independent position and/or orientation variables, such as pitch angle and attitude. In an illustrative embodiment, the actuators can be electric winches. The actuation platform 11 is free to rotate about a pivot axis 24. In an illustrative embodiment, for example as shown in FIG. 3, the control system drives pitch angle, θ, to a feasible setpoint, θ sp 302, drives roll angle, φ, to a feasible setpoint, φ sp 304, and regulates altitude, z, to a feasible setpoint, z sp 306. In the illustrative embodiment shown in FIG. 3, separate pitch controller 312, roll controller 314, and altitude controller 316 determine commands for the difference between the forward and aft tether release rates ($\Delta^u$forward/aft) 322, the difference between the left and right tether release rates ($\Delta^u$left/right) 324, and the average tether release rate ($^u$ave) 326, respectively. These separate commands are then aggregated in a subsequent block 332 via a relationship such as:

$$^u\text{front,left}=^u\text{ave}+^{\Delta u}\text{forward/aft}+^{\Delta u}\text{left/right}$$

$$^u\text{front,right}=^u\text{ave}+^{\Delta u}\text{forward/aft}-^{\Delta u}\text{left/right}$$

$$^u\text{aft,left}=^u\text{ave}-^{\Delta u}\text{forward/aft}+^{\Delta u}\text{left/right}$$

$$^u\text{aft,right}=^u\text{ave}-^{\Delta u}\text{forward/aft}-^{\Delta u}\text{left/right}$$

where $^u$actuators 334 represents a control variable command, such as a tether release rate command. In an embodiment, an aerostat can be autonomously controlled by a remote computer 15, control unit 22, and/or data processing device 44 that uses the above described system.

In a further embodiment, a tethered aerostat 11 shown in FIGS. 1 and 2 is tethered to an actuation platform 12 having at least 2 independent actuators 21 that control a control variable of the aerostat tethers that are attached to the actuators. The control variable may be, by way of example, any one of tether payout length, tether release speed, tether acceleration, or tether tension, as well as maximum thresholds for variables, so that for example, tension above a certain threshold can result in additional tether being released so as to avoid excessive tension that would result in an increased risk of tether breakage. The aerostat 11 is connected to the actuator system via tethers 13. As shown in FIG. 2, each tether terminates at a single actuator. A control unit 22 can provide inputs (voltages or other inputs known in the art) to the actuators 21 to achieve desired value of the tether control variable. The control unit 22 can provide commands via communication links 23 to the actuators 21 to regulate at least one independent position and/or orientation variables, such as pitch angle, altitude, and/or attitude.

An optional remotely-operated host computer 15 allows the user to interact with the system via a communication link 16, which can be wired or wireless. Communication can occur between the remote computer 15 and the base station control unit 22, between a remote computer 15 and a data processing device 44, or can be communicated directly between the remote computer 15 and at least one actuator 21 According to an illustrative embodiment, the communication link of 16 is bi-directional, allowing a remote user to input commands to the actuator platform 12 and receive data (telemetry) from it. The communication link 16 can also be uni-directional to allow for uni-directional flow of data from the actuator platform to the remote user and vice versa. Optionally, the remotely-operated host computer can autonomously control the aerostat using the control systems described herein.

An additional data processing device 44 can be provided, such as a microcontroller or rapid prototyping board, that receives and aggregates the data from the measurement units on the aerostat 11 and sends this data through the conductive cable element to the control unit 22 via the aforementioned communication link 14. See FIG. 4 for example. This aerostat data processing device 44 can include filters (for example for extracting important information from noisy signals or blending several measurements), as well as algorithms for prioritizing and timing the dissemination of data packets through the conductive tether to the control unit 22.

Figure 4:
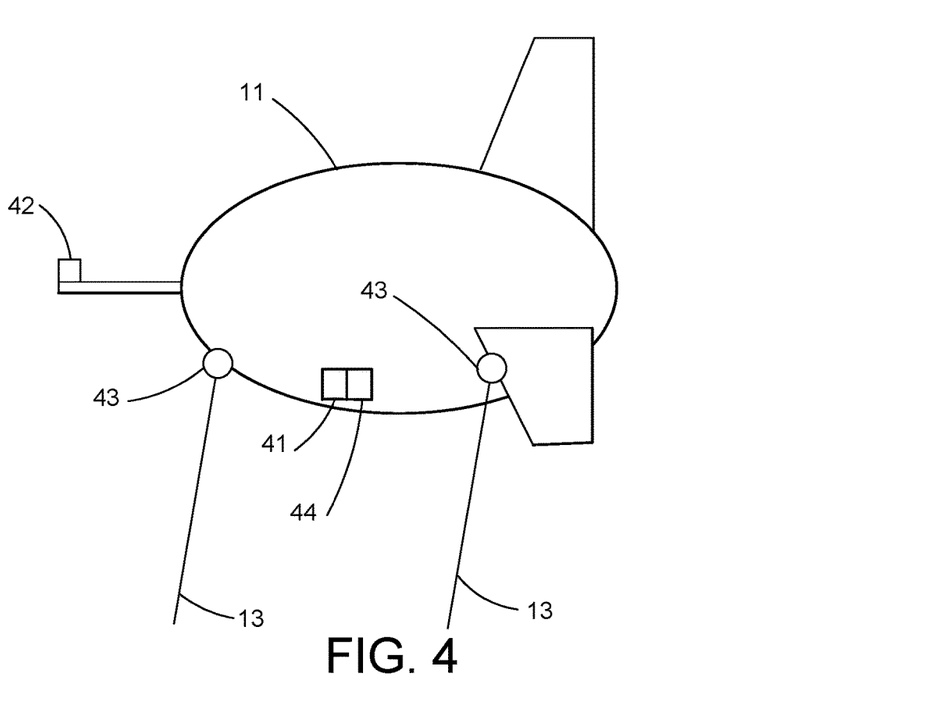
FIG. 4 is a diagram of a side view of an aerostat and its various components, according to the illustrative embodiment.

A wind measurement unit 42 can be employed to measure wind velocities and communicate these measurements to the base station control unit 22 via the communication link 14, in accordance with ordinary skill.

A tension measurement device 43 can be employed, such as a load cell or strain gauge, to measure the tension within at least one tether and communicate this measurement to the control unit 22 via the communication link 14. As illustrated in FIG. 4, this tension is measured at the point of attachment between the tethers and shroud. In further embodiments, the tension is measured at the base station through load cells that measure the reaction between the actuators and base station.

The "Combination and Restriction" element or process in FIG. 3 is constructed and arranged to limit tether release commands whenever tether tensions fall below a specified threshold. In an illustrative embodiment, this block limits both forward release rate commands to a maximum of approximately 0, indicating that tether can be pulled in but not released, any time that all forward tether tensions fall below the threshold. The combination and restriction process also restricts both aft tether release rate commands to a maximum of approximately 0 any time that all aft tether tensions fall below the threshold. In another illustrative embodiment, the combination and restriction block limits both forward release rate commands to a maximum of approximately 0 any time that the average forward tether tension falls below the threshold and limits both aft tether release rate commands to a maximum of approximately 0 any time that the average aft tether tension falls below the threshold. In another illustrative embodiment, the combination and restriction block includes a tether tension controller that computes separate tension-based control input commands for each tether. In the illustrative embodiment, the final control commands are taken as the minimum of the tension-based control input commands and the original input commands, $u_{front,left}$, $u_{front,right}$, $u_{aft,left}$, and $u_{aft,right}$, derived from altitude, pitch and roll controllers.

As shown in FIG. 4, an inertial measurement unit (IMU) 41, can be included in or on the aerostat 11, which can measure roll, pitch, and yaw angles in Euler angles, as well as their rates of change. A communication link 14 can be provided (for example, a hard-wired or wireless communication), which can communicate measured attitude and rate measurements between the aerostat 11 and the control unit 22.

A pivot axis 24 is defined on the actuator platform 12, which includes a heading sensor 25 such as a magnetometer, and a communication link 26 between the heading sensor and the control unit 22. In an embodiment, actuator platform 12 can rotate freely about pivot axis 24. A rotational actuator 27 can also be optionally employed and can be used to actively alter the heading of the actuator platform. The heading reading from the sensor 25 is used in conjunction with the shroud heading from its IMU 41 of the aerostat 11 to compute the appropriate control input to the rotational actuator 27.

In a further embodiment, the control unit 22 can provide commands via communication links 23 to the rotational actuator 27 to control a control variable of the actuator platform 12. The control variable of the actuator platform may be, by way of example, actuator platform angular orientation (heading), actuator platform angular velocity, or actuator platform angular acceleration. Changing the actuator platform angular orientation can effectively change the tether tensions, which can affect aerostat position and orientation. The control unit 22 provides commands via communication links 23 to the rotational actuator 27 to regulate at least one independent position and/or orientation variables of the aerostat, such as pitch angle and attitude.

Figure 5:
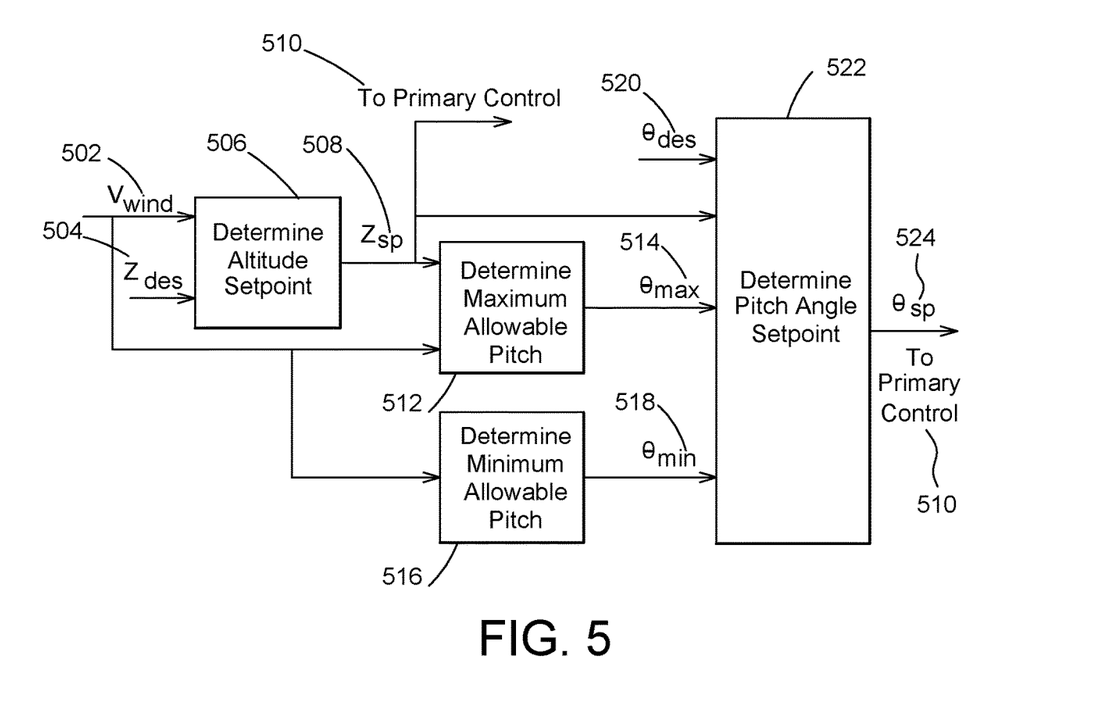
FIG. 5 is a block diagram of the various stages for determining setpoints of a reference governor in accordance with the illustrative embodiment.

Turning now to FIG. 5, shown is an exemplary block diagram of an embodiment of various stages for determining setpoints of a reference governor. Input $V_{wind}$ (wind velocity) 502 and input $Z_{des}$ (desired altitude) 504 can be used in stage 506 to determine altitude setpoint $Z_{sp}$ (altitude setpoint) 508. $Z_{sp}$ 508 can then be communicated to primary control 510 for use as a control variable. Primary control 510 can be control unit 22. $Z_{sp}$ 508 and $V_{wind}$ 502 can be used as inputs to stage 512 to determine the maximum allowable pitch $\Theta_{max}$ 514. $V_{wind}$ 502 is also used as an input in stage 516 to determine minimum allowable pitch, $\Theta_{min}$ 518. The desired pitch, $\Theta_{des}$ 520, $Z_{sp}$ 508, $\Theta_{max}$ 514, and $\Theta_{mm}$ 518, can be used as inputs to stage 522 to determine pitch angle setpoint, $\Theta_{sp}$ 524. $\Theta_{sp}$ 524 can then be communicated to primary control 510 for use as a control variable. In an embodiment, an aerostat can be autonomously controlled through the system described above by using various inputs to determine appropriate control variables that can be communicated to a primary control system 510 that can be control unit 22. An aerostat can be autonomously controlled through use of the above described system by data processing device 44, control unit 22, and/or a remote computer 15 utilizing at least one of a communication link to control unit 22 or a communication link to at least one actuator 21.

Figure 6:
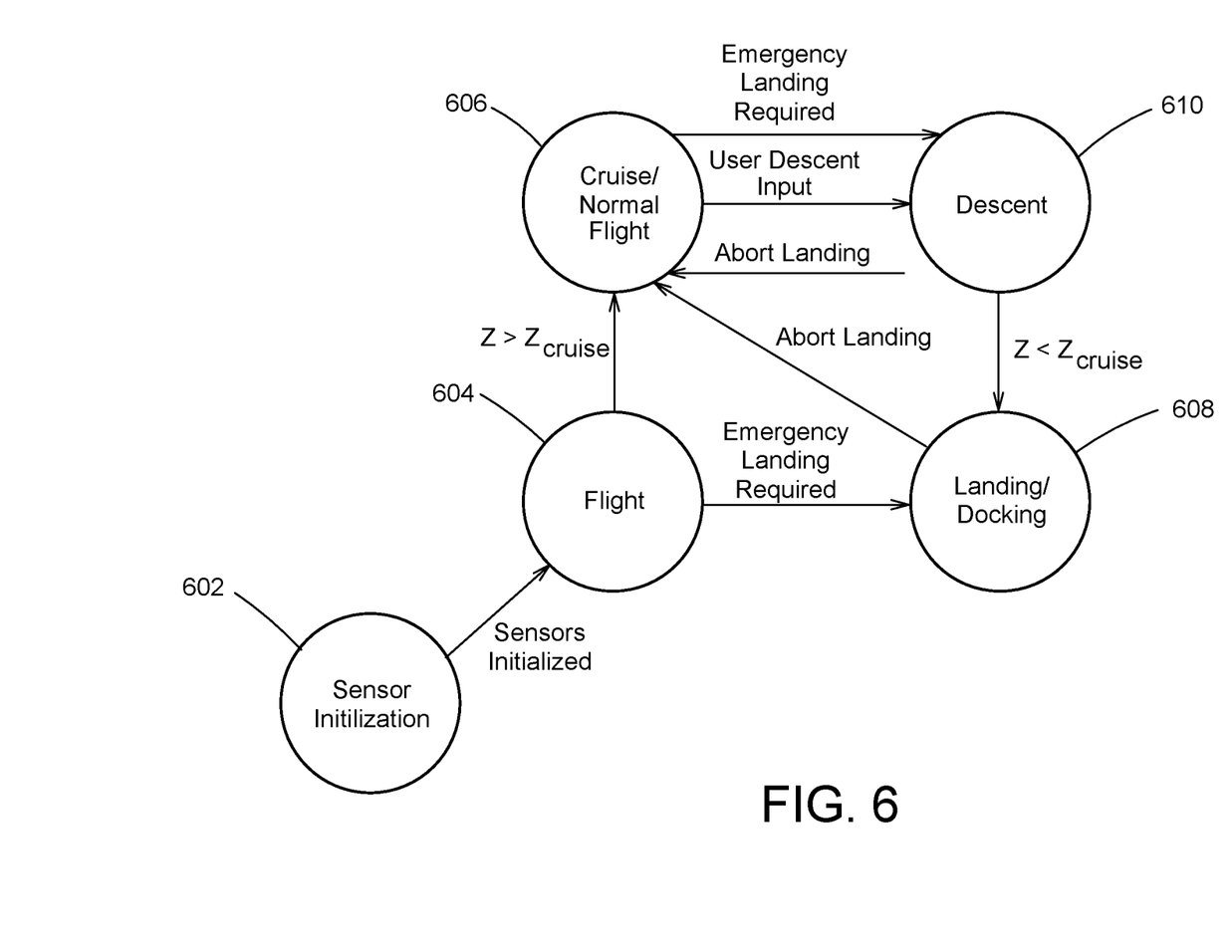
FIG. 6 is a flow diagram of the modal control for operation of the main controller, in accordance with the illustrative embodiment.

Turning now to FIG. 6, shown is a flow diagram of an illustrative embodiment of a modal control for operation of the main controller. Step 602 is sensor initialization. After sensors are initialized, an aerostat is launched in step 604, Launch. If altitude, Z, is greater than or equal to cruising altitude, $Z_{cruise}$, then the aerostat is in cruise/normal flight mode in step 606, Cruise/Normal Flight. If an emergency landing is required after launch, then proceed to step 608 Landing/Docking, where the aerostat can be landed/docked. If desired, the landing can be aborted, and the aerostat can be returned to normal flight mode in step 606, Cruise/Normal Flight. While the aerostat is in Cruise/Normal Flight step 606, it can proceed to descent mode in step 610, Descent. The aerostat can proceed from step 606, Cruise/Normal Flight, to step 610, Descent, if an emergency landing is required, or based on user descent input. In descent mode 610, Descent, altitude Z can be decreased until altitude Z is less than cruising altitude $Z_{cruise}$, When altitude Z is less than cruising altitude $Z_{cruise}$, the aerostat can enter landing/docking mode in step 608 Landing/Docking. While in descent mode, 610 Descent, the descent can be aborted and the aerostat returned to step 606, Cruise/Normal Flight. In an embodiment, an aerostat can be autonomously controlled through use of the above described system by data processing device 44, control unit 22, and/or a remote computer 15 utilizing at least one of a communication link to the control unit 22 or a communication link to at least one actuator 21.

The systems and methods herein also support constrained optimization-based determination of setpoints that can optionally be determined autonomously (free of user intervention). According to an illustrative embodiment, the control unit 22 for the main invention does not receive setpoints input by an external user but rather optimizes these setpoints internally via an optimal control technique. This advantageously allows users to trade off multiple performance objectives (for example, transient performance and tether tensions). In an embodiment, autonomous control of an aerostat can be implemented by at least one processor in data processing device 44, remote computer 15, and/or control unit 22.

The foregoing has been a detailed description of illustrative embodiments of the invention. Various modifications and additions can be made without departing from the spirit and scope of this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, the teachings herein are applicable to a wide range, size and type of aerostats without departing from the scope of the present invention. Shape and contour of the aerostat are highly variable so long as they include the control systems and methods described herein. Additionally, directional and locational terms such as "top", "bottom", "center", "front", "back", "above", and "below" should be taken as relative conventions only, and not as absolute. Finally, the placement and location of actuators and tethers are highly variable so long as they are in accordance with the teachings shown and described herein. Accordingly, this description is meant to be taken only by way of example, and not to otherwise limit the scope of this invention.

What is claimed is:

1. A system for controlling a tethered aerostat, the system comprising:
   a base station including an actuation platform comprising an actuator system that is secured to the tethered aerostat via a plurality of tethers;
   the actuation platform having at least two actuators for respective control of at least one control variable of the tethered aerostat with at least two of the plurality of tethers, wherein the at least one control variable comprises at least a pitch angle and an altitude control; and
   a control unit for providing input to at least one of the at least two actuators to control the at least one control variable of tethered aerostat to a respective setpoint, wherein:
   the pitch angle is controlled by varying at least a difference between tether release rates of a first tether and a second tether of the plurality of tethers; and
   the altitude control is controlled by varying at least an average release rate among the plurality of tethers.

2. The system as set forth in claim 1 wherein the at least one control variable further comprises tether payout length.

3. The system as set forth in claim 1 wherein the at least one control variable further comprises tether release speed.

4. The system as set forth in claim 1 wherein the at least one control variable further comprises tether acceleration.

5. The system as set forth in claim 1 wherein the at least one control variable further comprises tether tension.

6. A system for controlling a tethered aerostat, the system comprising:
   a base station including an actuation platform comprising an actuator system that is secured to the tethered aerostat via a plurality of tethers;
   the actuation platform having at least two actuators for respective control of at least one control variable of the tethered aerostat with at least two of the plurality of tethers, wherein the at least one control variable comprises at least a pitch angle;

the actuation platform comprising an actuation platform rotational actuator for control of at least one control variable of the actuation platform, the at least one control variable of the actuation platform comprises at least an actuation platform angular orientation; and a control unit for providing an input to at least one of the at least two actuators to control the at least one control variable of the tethered aerostat according to a respective setpoint, and wherein the pitch angle is controlled by varying at least a difference between tether release rates of a first tether and a second tether of the plurality of tethers.

7. The system of claim 6, wherein the at least one control variable of the actuation platform comprises actuation platform angular speed.

8. The system of claim 6, wherein the at least one control variable of the actuation platform comprises actuation platform angular acceleration.

9. The system of claim 6, wherein the at least one control variable comprises any of roll control, altitude control, and attitude control of the tethered aerostat.

10. The system of claim 6, wherein the control unit includes a setpoint for the control variable of the tethered aerostat.

11. The system of claim 6, wherein the tethered aerostat is controllable for any of surveillance, weather monitoring, communications, and power generation.

12. The system of claim 1, wherein the at least one control variable comprises any of roll control and attitude control of the tethered aerostat.

13. The system of claim 1, wherein the control unit includes a setpoint for the control variable of the tethered aerostat.

14. The system of claim 1, wherein the tethered aerostat is controlled for any of surveillance, weather monitoring, communications, and power generation.

15. A method for controlling an aerostat, the method comprising:

securing the aerostat to a base station via a plurality of tethers, the base station including an actuation platform having at least two actuators;

controlling at least one control variable of the actuation platform, wherein the at least one control variable of the actuation platform comprises at least an actuation platform angular orientation; and controlling, according to a respective setpoint, at least one control variable of the aerostat with at least two of the plurality of tethers each controlled by a respective one of the at least two actuators, wherein the at least one control variable of the aerostat comprises at least a pitch angle controlled by varying at least a difference between tether release rates of a first tether and a second tether of the plurality of tethers.

16. The method of claim 15, wherein the actuation platform includes an actuation platform rotational actuator, the method further comprising:

controlling the at least one control variable of the actuation platform with the rotational actuator.

17. The method of claim 15, wherein the control variable of the rotational actuation platform comprises at least one of actuator platform angular speed and actuator platform angular acceleration.

18. The method of claim 15, wherein the at least one control variable of the aerostat further comprises at least one of tether payout length, tether release speed, tether acceleration, tether slip threshold, and tether tension.

19. The method of claim 15, further comprising
controlling the aerostat for any of surveillance, weather monitoring, communications, and power generation.

20. The system of claim 9, wherein a setpoint of the altitude control is determined at least on a wind velocity and a desired altitude.

* * * * *

UNITED STATES PATENT AND TRADEMARK OFFICE
CERTIFICATE OF CORRECTION

PATENT NO. : 11,230,391 B2
APPLICATION NO. : 15/776552
DATED : January 25, 2022
INVENTOR(S) : Christopher R. Vermillion et al.

Page 1 of 1

It is certified that error appears in the above-identified patent and that said Letters Patent is hereby corrected as shown below:

In the Claims

At Column 10, Claim 17, Line 25, the text "of the rotational actuation platform comprises at least one of" should read --of the actuation platform comprises at least one of--

Signed and Sealed this
Twenty-fourth Day of May, 2022

Katherine Kelly Vidal
*Director of the United States Patent and Trademark Office*